United States Patent [19]
Madisetti et al.

[11] Patent Number: 5,737,253
[45] Date of Patent: Apr. 7, 1998

[54] METHOD AND APPARATUS FOR DIRECT DIGITAL FREQUENCY SYNTHESIZER

[75] Inventors: Avanindra Madisetti; Alan Y. Kwentus, both of Torrance, Calif.

[73] Assignee: Pentomics, Inc., Los Angeles, Calif.

[21] Appl. No.: 521,173

[22] Filed: Aug. 30, 1995

[51] Int. Cl.$^6$ .................................................. G06F 1/02
[52] U.S. Cl. .................................................. 364/721
[58] Field of Search .................................. 364/721, 718

[56] References Cited

U.S. PATENT DOCUMENTS

| | | | |
|---|---|---|---|
| 4,905,177 | 2/1990 | Weaver, Jr. et al. | 364/721 |
| 4,910,698 | 3/1990 | McCartney | 364/721 |
| 5,142,487 | 8/1992 | Graham, III | 364/721 |
| 5,467,294 | 11/1995 | Hu et al. | 364/721 |
| 5,521,534 | 5/1996 | Elliott | 364/221 |

Primary Examiner—David H. Malzahn
Attorney, Agent, or Firm—Irell & Manella LLP

[57] ABSTRACT

The present invention comprises a direct digital frequency synthesizer. A phase accumulator provides a normalized angle $\theta$ to a sine/cosine generator that outputs the value of the sine/cosine function at the provided angle. The sine/cosine generator in a preferred embodiment comprises a plurality of multiplierless butterfly and carry-save stages in cascade that perform angle rotations on a phasor on the unit circle whose x and y coordinates correspond to cosine and sine values. To calculate the sine and cosine values at a particular angle $\theta = b_1\theta_1 + b_2\theta_2 + \ldots + b_N\theta_N$ where $b_k \in \{0, 1\}$ are the binary bits and the $\theta_k = 2^{-k}$ are the associated positional weights, each of the butterfly and carry-save stages rotate the phasor by an amount $\theta_k = 2^{-k}$. The direction of the rotation, clockwise or counter-clockwise, depends upon the value of the binary bits $b_k$. After undergoing all of the rotations, the phasor has x and y coordinates that approximate the desired cosine and sine values to a specified accuracy. In a preferred embodiment, the datapath of the present invention is multiplierless. The stages for angles where the approximation $\tan \theta_k = \theta_k$ is acceptable are multiplierless while for angles where this approximation does not hold, the x and y phasor coordinates are transformed through a multiplexer or a ROM.

55 Claims, 10 Drawing Sheets

FIG. 3
_PRIOR ART_
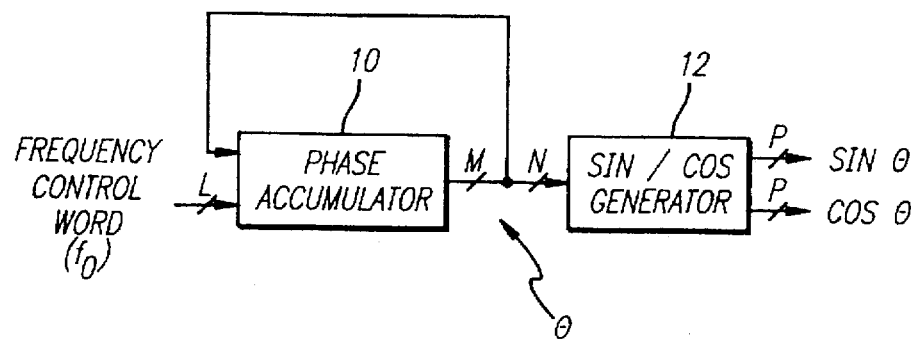

$$c_i = \begin{cases} \tan \theta_i & \text{if } b_{i-1} = 0 \ (r_i = -1) \\ -\tan \theta_i & \text{if } b_{i-1} = 1 \ (r_i = 1) \end{cases}$$

| k | θ | tan θ | θ (22-bit binary) | tan θ (22-bit binary) |
|---|---|---|---|---|
| 1 | 0.500000 | 0.546302 | 0100000000000000000000 | 0100010111101101001111 |
| 2 | 0.250000 | 0.255342 | 0010000000000000000000 | 0010000010101111000010 |
| 3 | 0.125000 | 0.125655 | 0001000000000000000000 | 0001000000101010101101 |
| 4 | 0.062500 | 0.062582 | 0000100000000000000000 | 0000100000000101010101 |
| 5 | 0.031250 | 0.031260 | 0000010000000000000000 | 0000010000000000010101 |
| 6 | 0.015625 | 0.015626 | 0000001000000000000000 | 0000001000000000000010 |
| 7 | 0.007812 | 0.007813 | 0000000100000000000000 | 0000000100000000000000 |
| 8 | 0.003906 | 0.003906 | 0000000010000000000000 | 0000000010000000000000 |
| 9 | 0.001953 | 0.001953 | 0000000001000000000000 | 0000000001000000000000 |
| 10 | 0.000977 | 0.000977 | 0000000000100000000000 | 0000000000100000000000 |

METHOD AND APPARATUS FOR DIRECT DIGITAL FREQUENCY SYNTHESIZER

BACKGROUND OF THE INVENTION

1. Field of the Invention

The present invention relates to digital signal generators and more particularly to Direct Digital Frequency Synthesizers (DDFS).

2. Art Background

For many digital circuits, it is often necessary to generate a sequence of sample values of a sine or cosine function at a particular frequency that may be adjusted while the interval between samples remains fixed. Circuits known as Direct Digital Frequency Synthesizers (DDFS) perform this function. Many prior art DDFS's generate the sine and cosine values by performing a table-lookup in a read only memory (ROM) that contains the values of samples of a sine/cosine function at the required angle values, and then providing these values as the output. The sequence of desired angles is generated by a phase accumulator. More precisely, the phase accumulator produces a sequence of normalized angles that are used to address the ROM. The table-lookups are performed at a very precisely controlled rate, which is the sample rate, and the desired frequency of the generated sinusoid is determined by the rate, relative to this reference rate, at which angles generated by the phase accumulator cycle through a range of values corresponding to 0 to $2\pi$.

Although these prior art table-lookup DDFS's perform adequately for many purposes, the tables often are large and occupy a relatively large amount of chip area when implemented as integrated circuits. Various techniques have been developed to reduce the ROM table size, which is determined by the number of address bits (i.e., the phase accumulator output) and the precision of (i.e., the number of bits representing) the sine/cosine outputs. Truncation of the phase accumulator output is usually employed in order to reduce the lookup table size, as this size will double with each additional bit in the table address word. Truncation, however, creates imperfections in the output sine/cosine function since a truncated sine/cosine value will correspond to an effective angle that is different from the sine/cosine value at the exact angle. Furthermore, the truncated phase accumulator values can be viewed as values obtained by adding some sequence of error terms to the sequence of exact angle values. Thus, the output of the table-lookup process will consist of the superposition of the sine/cosine signal at the desired frequency and various other frequencies that result from the processing of the error sequence by the table-lookup. These undesired frequency components are referred to as "spurious frequencies," or "spurs." The amplitude of these spurs should be small, and the quality of the DDFS is often assessed by determining how small the spurs are. The "spurious free dynamic range" is the difference between the amplitude of the desired sinusoid and that of the largest spur. It is usually measured in decibels (dB).

DDFS designs recently reported achieve 80 to 90 dB spurious-free dynamic range (SFDR) using a 15-bit ROM address. It is well known that each additional ROM address bit typically reduces spurs by approximately 6 dB. In addition to the spurious frequency content due to phase accumulator truncation, another cause of spurs is the need to truncate the actual sine/cosine values stored in the table. Since it is impossible to store infinite precision values in the table, such error is inevitable. One must store enough bits that an adequate approximation is given, but increasing the output precision causes a linear expansion in the ROM size; that is the ROM size varies linearly with the number of bits in the data values. As the ROM table becomes larger, it is difficult to achieve high-speed operation and low power dissipation with small chip area.

One prior art technique for generating trigonometric functions such as sine and cosine, developed in the 1950's and known as CORDIC, avoids ROM table-lookups. CORDIC calculates the sine and cosine values of a particular angle through a series of rotations of a phasor, initially coincident with the X-axis on the unit circle. The X-axis and the Y-axis coordinates of the phasor at the final angle are the desired cosine and sine values, respectively, as shown in FIG. 1. In principle, the $X_\theta = \cos\theta$ and $Y_\theta = \sin\theta$ coordinates can be computed from an initial point $X_0=1$, $Y_0=0$ by $$\begin{bmatrix} X_\theta \\ Y_\theta \end{bmatrix} = \begin{bmatrix} \cos\theta & -\sin\theta \\ \sin\theta & \cos\theta \end{bmatrix} \begin{bmatrix} X_0 \\ Y_0 \end{bmatrix} = \cos\theta \begin{bmatrix} 1 & -\tan\theta \\ \tan\theta & 1 \end{bmatrix} \begin{bmatrix} X_0 \\ Y_0 \end{bmatrix}$$

This computation cannot be implemented directly since the $\sin\theta$ and $\cos\theta$ coefficients are themselves the variables to be determined. However, the computation can be broken into a sequence of subrotation computations, as shown in FIG. 2, that can be implemented. If $\theta = \alpha_1\theta_1 + \alpha_2\theta_2 + \ldots \alpha_N\theta_N$, where $\theta_i = \tan^{-1} 2^{-i}$ and $\alpha_i \in \{-1, 1\}$, no multiplications are required to perform the rotations except for binary shifts since $\tan(\tan^{-1} 2^{-i}) = 2^{-i}$. The rotation by $\theta$ can now be written as $$\begin{bmatrix} X_\theta \\ Y_\theta \end{bmatrix} = \cos(\alpha_1\theta_1) \ldots \cos(\alpha_N\theta_N) \begin{bmatrix} 1 & -\tan(\alpha_1\theta_1) \\ \tan(\alpha_1\theta_1) & 1 \end{bmatrix} \ldots \begin{bmatrix} 1 & -\tan(\alpha_N\theta_N) \\ \tan(\alpha_N\theta_N) & 1 \end{bmatrix} \begin{bmatrix} X_0 \\ Y_0 \end{bmatrix}$$

However, according to the CORDIC methodology, at each rotation it must be determined whether to rotate clockwise or counter-clockwise, where a counter-clockwise rotation corresponds to $\alpha_i = 1$ and a clockwise rotation corresponds to $\alpha_i = -1$. CORDIC tries to approximate an angle $\theta$ as a sum of angles $\Sigma\theta_i$. At each stage, if the approximation generated by all previous stages is larger than the desired angle $\theta$, then the current stage decreases the value of the approximation by $\theta_i$; otherwise the approximation is increased by $\theta_i$. Thus, at each stage the direction of the rotation is chosen such that the error between the desired angle $\theta$ and the approximation is reduced. In CORDIC, the $\alpha_i$ coefficients (which determine the direction of the rotation) are determined iteratively for each rotation stage and each one requires a comparator or its equivalent.

The present invention provides a new approach to DDFS that is superior to current ROM and CORDIC based approaches.

SUMMARY OF THE INVENTION

The present invention provides a high-speed DDFS integrated circuit with high precision sine and cosine output data and a chip area smaller than could be obtained using table-lookup-based or CORDIC approaches to the DDFS. According to the present invention, a phase accumulator provides a sequence of angles to a sine/cosine generator that outputs a sequence of values of the sine/cosine function at a desired frequency. The sine/cosine generator in a preferred embodiment comprises a plurality of multiplierless butterfly and carry-save stages in cascade that perform angle rotations to calculate the sine and cosine values for each desired angle. The angle rotations are chosen to implement a series of transformations that result in closer and closer approximations to the sine and cosine values of the desired angle.

As previously described, the computation of sin θ and cos θ for a given θ can be viewed as the computation of the X-axis and the Y-axis coordinates of a point on the unit circle. This point can be located by rotating a phasor counter-clockwise from an initial position coincident with the X-axis through an angle θ, which may be represented by the computations:

$$\begin{bmatrix} X_\theta \\ Y_\theta \end{bmatrix} = \cos(b_1\theta_1)\ldots\cos(b_N\theta_N) \begin{bmatrix} 1 & -\tan(b_1\theta_1) \\ \tan(b_1\theta_1) & 1 \end{bmatrix} \ldots$$
$$\begin{bmatrix} 1 & -\tan(b_N\theta_N) \\ \tan(b_N\theta_N) & 1 \end{bmatrix} \begin{bmatrix} X_0 \\ Y_0 \end{bmatrix}$$

In this equation, $b_1\theta_1+b_2\theta_2+\ldots+b_N\theta_N$ is the binary representation of θ where $b_k \in \{0,1\}$ are the binary bits and the $\theta_k=2^{-k}$ are the associated positional weights. The subangles are $\theta_k=2^{-k}$ radians. Thus, unlike CORDIC, the coefficients $b_k$ in the angle expansion are determined directly from the binary representation of the angle. Also, the angles themselves are different from those of CORDIC. For example, the first CORDIC rotation angle is $(\tan^{-1}\frac{1}{2})$ radian while our first rotation angle is ½ radian. The binary $b_k \in \{0,1\}$ can be recoded into signed digits $r_k \in \{-1,1\}$ for an arbitrary angle θ by the mapping $r_k=2b_{k-1}-1$. Each butterfly and carry-save stage implements a transformation that corresponds to one of the rotation matrices in the above equation and the sign of the coefficient $r_k$ dictates the direction of rotation. Since the coefficients $r_k$ are determined from the binary coefficients $b_k$, the present invention, unlike CORDIC, does not require an angle comparison at each stage to determine whether the angle rotation is clockwise or counter-clockwise.

For sufficiently small $\theta_k$ (i.e., for sufficiently large k) the approximation $\tan \theta_k = \theta_k = 2^{-k}$ reduces the corresponding multiplication performed by the butterfly and carry-save stages to a simple shift operation by a fixed number of bits (k bits). This approximation causes no loss of accuracy in the $\tan \theta_k$ representation so long as $\theta_k$ is sufficiently small that the difference ($\theta_k - \tan \theta_k$) is smaller than the finite-precision limits of the data.

In a preferred embodiment, a multiplexer provides sine and cosine values for an angle that is the sum of the first M subangles $\theta_k$, those that are not sufficiently small to employ the approximation $\tan \theta_k=\theta_k$. The angles become successively smaller for each successive stage and the remaining angles after these first M angles satisfy the approximation $\tan \theta_k=\theta_k$ to a desired accuracy. The sine and cosine values provided by the multiplexer are then input to the subsequent rotation stages, which perform the above rotations to calculate the sine and cosine values for the desired angle. Rather than using a multiplexer, a small ROM table can also be used to perform the same function.

Only angles in [0,π/4] need be provided to the rotation stages and the sine and cosine values for any angle in [0,2π] can be computed from these angles by well known trigonometric identities. The present invention includes methods and apparatus for converting an angle in [0,2π] to a related angle in [0,π/4], performing the previously described rotations to calculate sine and cosine values for the transformed angle, and then deriving the sine and cosine values for the original angle in [0,2π] from the sine and cosine values for the transformed angle in [0,π/4].

To summarize, an angle $\theta=b_1\theta_1+b_2\theta_2+\ldots+b_N\theta_N$ is generated where $b_k \in \{0,1\}$ are the binary bits and the $\theta_k=2^{-k}$ are the associated positional weights. Next, the sine and cosine values for a subangle ω, the sum of the first M rotation angles of θ, are obtained through a multiplexer or similar device (e.g., ROM table). In a preferred embodiment, ω is chosen such that the remaining subangles that are processed obey the approximation $\tan \theta_k=\theta_k$ and the binary $b_k \in \{0,1\}$ are recoded into signed digits $r_k \in \{-1,1\}$ for an arbitrary angle θ by the mapping $r_k=2b_{k-1}-1$. The following transformation formulae are then used:

$$X_k=X_{k-1}-r_k2^{-k}Y_{k-1}$$
$$Y_k=Y_{k-1}+r_k2^{-k}X_{k-1}$$

where $X_{k-1}$ is the cosine value and $Y_{k-1}$ is the sine value. The determined $X_k$ cosine value and $Y_k$ sine value are then successively provided as the $X_{k-1}$ and $Y_{k-1}$ inputs to the transformation formulae until the desired accuracy is reached.

BRIEF DESCRIPTION OF THE DRAWINGS

The objects, features and advantages of the present invention will be apparent from the following detailed description of the preferred embodiment of the invention with references to the drawings in which:

FIG. 3 is a block diagram of a Direct Digital Frequency Synthesizer (DDFS) with a phase accumulator that provides an angle to a sine/cosine generator that outputs the value of the sine/cosine function at the provided angle.

DETAILED DESCRIPTION OF THE INVENTION

The present invention discloses an improved Direct Digital Frequency Synthesizer. In the following description, numerous specific details are set forth in order to provide a thorough understanding of the present invention. However, it will be apparent to one skilled in the art that the present invention may be practiced without these specific details. In other instances, well-known circuits, structures, and the like are not described in detail so as not to obscure the present invention unnecessarily.

FIG. 3 is a block diagram of a Direct Digital Frequency Synthesizer (DDFS). A phase accumulator 10 provides a normalized angle θ to a sine/cosine generator 12 that outputs the value of the sine/cosine function at the desired angle. The sequence of normalized angle values is provided by the phase accumulator 10 at a very precisely controlled rate, which is the sample rate, provided by a clock (not shown). The desired output frequency of the generated sequence of sine/cosine function values is determined by the rate, relative to the sample rate, at which the values generated by the phase accumulator cycle through the (normalized) range of values corresponding to the range 0 to $2\pi$. This rate and, hence, the output frequency of the generated sine/cosine signals may be adjusted by supplying different frequency control words $f_0$ to the phase accumulator, as shown in FIG. 3.

Figure 4:
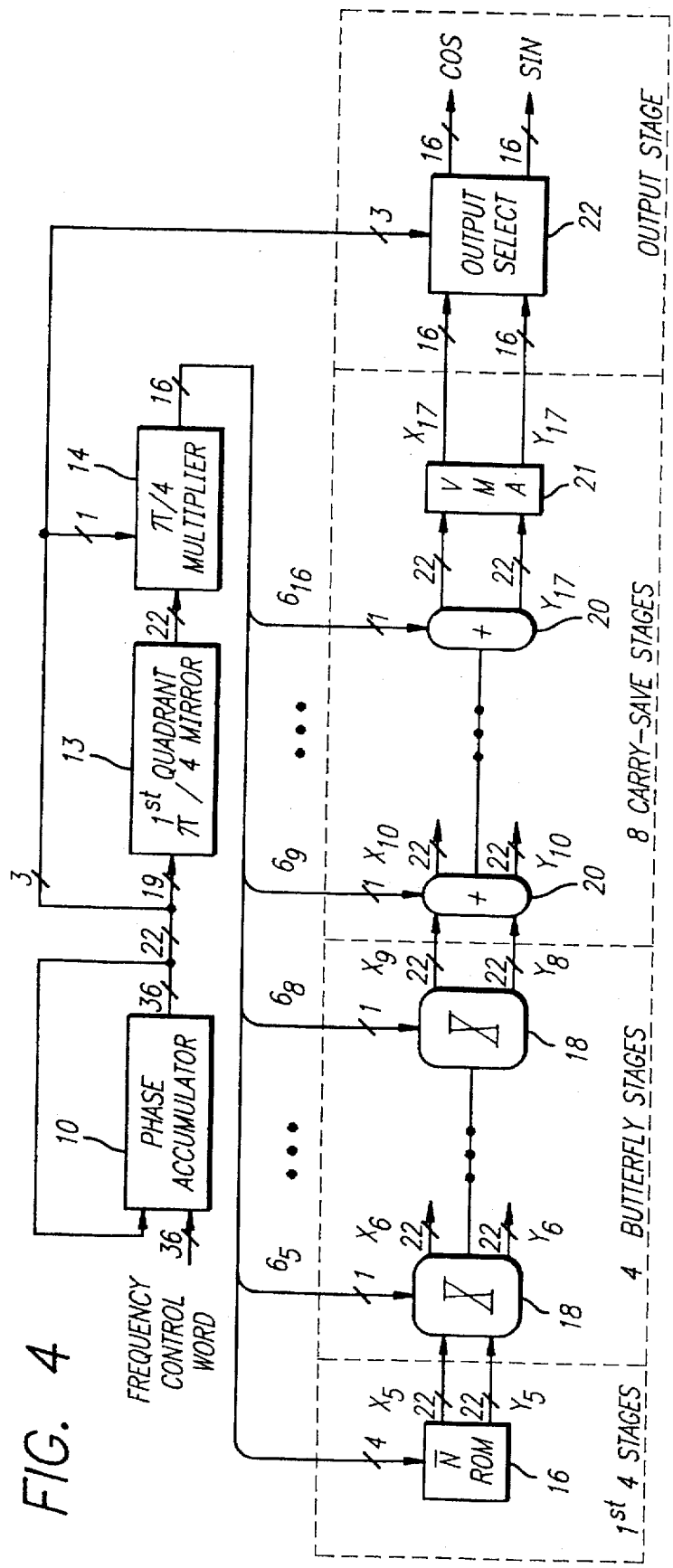
FIG. 4 is a block diagram of the preferred embodiment of the Direct Digital Frequency Synthesizer (DDFS) of the present invention.

FIG. 4 is a block diagram of the preferred embodiment of the DDFS of the present invention. A normalized angle is provided by the phase accumulator 10 to a $\pi/4$-quadrant mirror 14 and a $\pi/4$-multiplier 13 whose functions will be described more fully below. Components of the output of the $\pi/4$-multiplier 13 (an angle θ in radians) are provided in parallel to a plurality of stages, including a ROM 16, a plurality of butterfly stages 18, and a plurality of carry-save stages 20. The ROM 16, butterfly 18 and carry-save stages 20 calculate cosine and sine functions from the angle θ provided by the $\pi/4$-multiplier 13. A vector merge adder ("VMA") 21 is coupled to the last carry-save stage 20 and is further coupled to an output stage 22 that maps the computed cosine/sine values in $[0,\pi/4]$ to the appropriate values in $[0, 2\pi]$.

Figure 1:
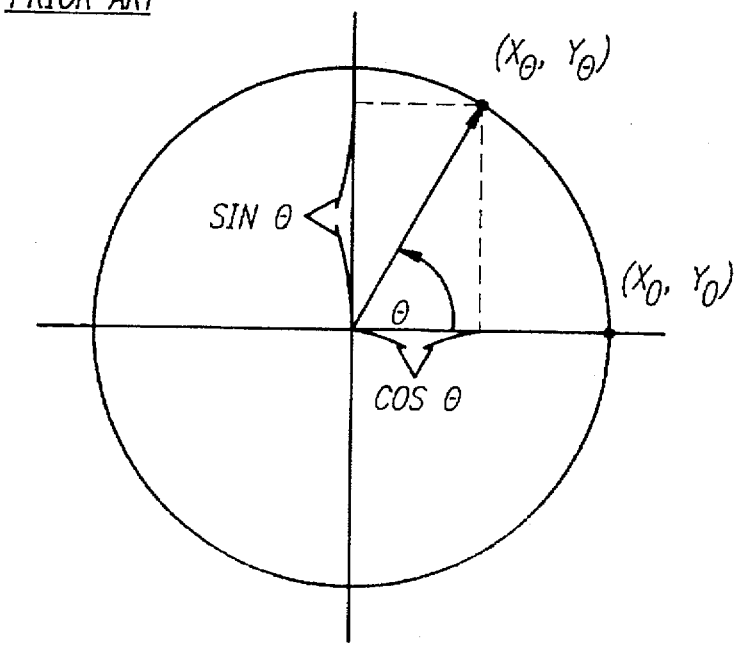
FIG. 1 shows the computation of sin θ and cos θ for a given θ as the computation of the X-axis and the Y-axis coordinates of a point on the unit circle.
Figure 2:
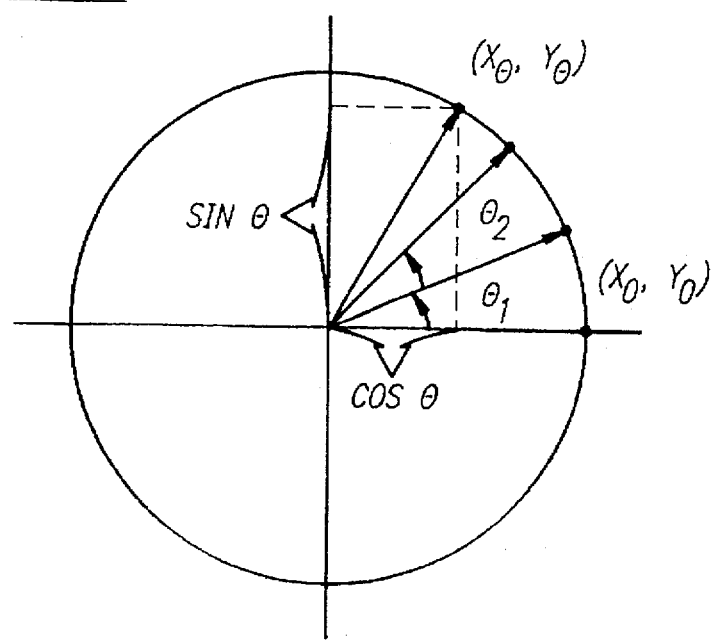
FIG. 2 shows the computation of sin θ and cos θ for a given θ as a series of subrotations.

As previously described, the computation of sin θ and cos θ for the angle θ provided by the $\pi/4$-multiplier 13 can be viewed as the computation of the X-axis and the Y-axis coordinates of a point on the unit circle, as shown in FIG. 1. The computation can be broken into a sequence of subrotation computations as shown in FIG. 2. In accordance with the present invention, each subrotation corresponds to a known angle. In general, the arbitrary angle θ(<1 radian) can be expressed as $\theta = b_1\theta_1 + b_2\theta_2 + \ldots + b_N\theta_N$ where $b_k \in \{0, 1\}$ are the binary bits of the angle θ and the $\theta_k = 2^{-k}$ are the associated positional weights. For example, for θ=0.5 radian, $\theta = (0)2^0 + (1)2^{-1} + (0)2^{-2} + \ldots (0)2^{-N}$ which is 010000 . . . 0 represented in binary. Thus $b_k = 1$ corresponds to a subrotation by $\theta_k = 2^{-k}$ and $b_k = 0$ corresponds to "no rotation." The rotation by θ can now be written as:

$$\begin{bmatrix} X_\theta \\ Y_\theta \end{bmatrix} = \cos(b_1\theta_1) \ldots \cos(b_N\theta_N) \begin{bmatrix} 1 & -\tan(b_1\theta_1) \\ \tan(b_1\theta_1) & 1 \end{bmatrix} \ldots$$

$$\begin{bmatrix} 1 & -\tan(b_N\theta_N) \\ \tan(b_N\theta_N) & 1 \end{bmatrix} \begin{bmatrix} X_0 \\ Y_0 \end{bmatrix}$$

This formula has the same form as the CORDIC transformation. However, unlike CORDIC, the coefficients $b_k$ comprise the bits of the angle representation, expressed as a base-2 radian value, and thus each subrotation direction need not be determined iteratively by specialized circuitry as CORDIC requires. This is possible because the angles themselves are different from those of CORDIC. For example, the first CORDIC rotation angle is $(\tan^{-1} \frac{1}{2})$ radian while our first rotation angle is ½ radian.

Figure 5:
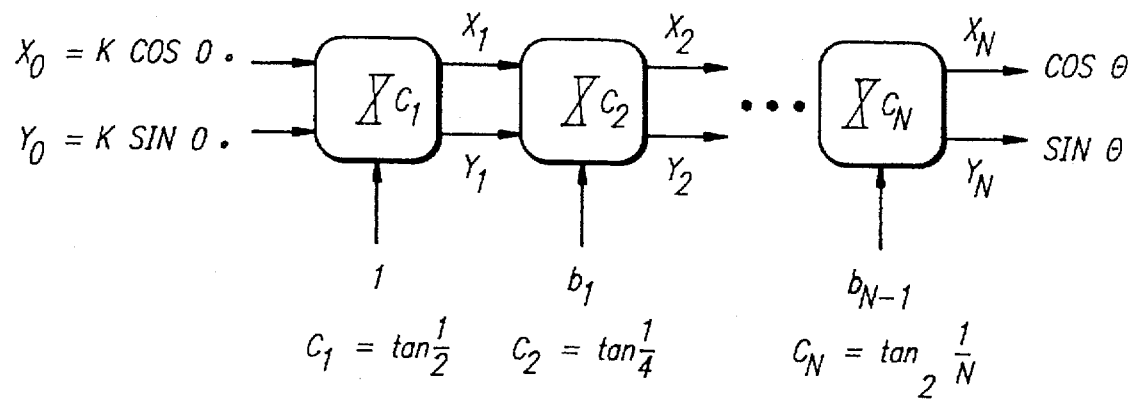
FIG. 5 illustrates the cascade of feed-forward butterfly stages that comprise the computation required by the sine/cosine generator illustrated in FIG. 3.

FIG. 5 illustrates a plurality of cascaded feed-forward butterfly stages which may be used to implement the above rotation. The stages illustrated in FIG. 5 effect a sequence of rotations that is always started from the fixed point $X_0=1$, $Y_0=0$, where the desired output precision determines the number of stages and the rotation angle at each stage is known ($\theta_k = 2^{-k}$). Each butterfly stage corresponds to one of the transformation matrices in the above equation and the direction of rotation of each stage is determined directly by the binary representation of the angle θ expressed in radians.

According to a preferred embodiment of the present invention, various refinements are made on the butterfly stages illustrated in FIG. 5. It can be shown that the binary $b_k \in \{0,1\}$ can be recoded into signed digits $r_k \in \{-1,1\}$ for an arbitrary angle θ by the mapping $r_k = 2b_{k-1} - 1$ and thus each butterfly stage, for any θ, consists of either a positive or negative $\theta_k$ subrotation, depending upon the sign of $r_k$. Therefore the product $K = \cos(r_2\theta_2) \ldots \cos(r_{N+1}\theta_{N+1})$ becomes a constant. Thus, the rotations are started from the fixed point $X_0 = K\cos\phi_0$, $Y_0 = K\sin\phi_0$ rather than at the point $X_0 = 1$, $Y_0 = 0$, where $\phi_0$ is an initial rotation by $(0.5-0.5^{N+1})$ radians. This eliminates the need to scale the final results by K.

Figures 6, 7:
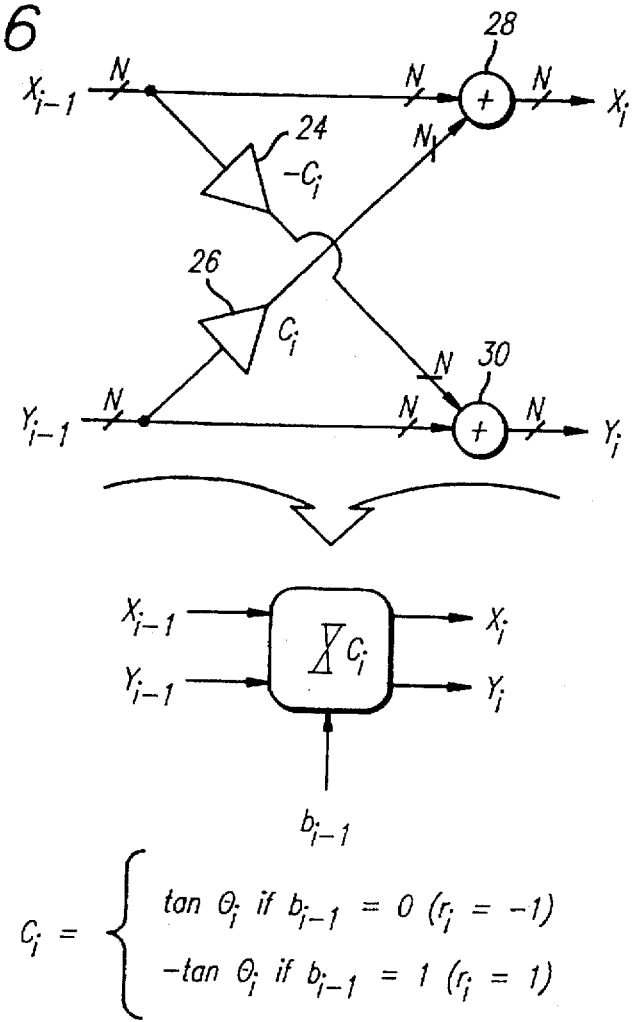
FIG. 6 illustrates the hardware implementation of the butterfly stages illustrated in FIG. 5.
FIG. 7 is a table showing 22-bit tangent values for particular angles and, in particular, that tan θ=θ to full 22–b accuracy for the angles in rows 7 through 10.

Multipliers may be eliminated from the butterfly stages illustrated in FIG. 5 by taking advantage of the approximation $\tan \theta_k = \theta_k$. For sufficiently small $\theta_k$ (i.e., for sufficiently large k), the approximation $\tan \theta_k = \theta_k = 2^{-k}$ reduces the multiplications performed by each butterfly stage to simple shift operations by a fixed number of bits (k bits). This approximation causes no loss in accuracy in the $\tan \theta_k$ representation so long as $\theta_k$ is sufficiently small that the difference ($\theta_k - \tan \theta_k$) is smaller than the finite-precision limits of the data. More precisely, given a B-bit internal word length, $\tan 2^{-k} = 2^{-k}$ to the full precision of the data for all k>B/3. For example, FIG. 7 shows values of $\tan 2^{-k}$ and $2^{-k}$ for k=1, . . . 10 with 22-bit data. For all stages where k>B/3=22/3 (i.e., for k>7) there is no loss of accuracy when the butterfly computations of FIG. 5 are reduced to a pair of shift (by a fixed number of bits) and add operations. In a preferred embodiment, since the initial values $X_0$, $Y_0$ are always the same, the first B/3 butterfly stages are merged together and implemented using the ROM 16, illustrated in FIG. 4, thereby avoiding the use of any $\tan \theta_k$ multipliers. (While this would require a table containing $128 = 2^7$ sine and cosine entries, simulations have shown that, in fact, the required accuracy can be maintained for the final output values if only the first four stages are replaced by the ROM 16. This introduces small errors in making the tan θ~θ approximation for butterfly stages 5 through 7, but requires a table of just $16 = 2^4$ sine and cosine values.) As will readily be appreciated, a multiplexer or other device may be employed instead of the ROM 16.

To minimize the size of the ROM 16, it is provided with the value θ in radians as opposed to the normalized value of θ provided by the phase accumulator 10. The ROM 16 may thus be smaller since the bit patterns that represent θ in radians are fewer than those of the normalized angle. For example, the value of $\pi/4$ in binary is 011001. . . . Thus, for radian angles used to access the 16-word ROM, the largest value the address bits can have is 1100, which implies that only a 13-word ROM is required. (The remaining three addresses are never used.)

FIG. 6 illustrates a preferred hardware implementation, including the refinements discussed above, of the butterfly stages 18 illustrated in FIG. 4. Each butterfly stage comprises two multipliers 24 and 26 and two adders 28 and 30. The multiplier coefficient $c_i$ is equal to $2^{-i}$ or $-2^{-i}$, depending upon the value of $r_i = 2b_{i-1} - 1$ as shown. Each $b_i$ value corresponds to the binary value of the i-th bit of the angle and the $b_i$ values are provided to the stages as illustrated in FIG. 4.

With reference to FIG. 4, the ROM 16 receives the four most significant bits of the angle provided by the $\pi/4$-multiplier 13 which are used to select one of thirteen 22-bit values that comprise the tangent of the angle that would otherwise result when rotating the input ($K \cos \phi$, $K \sin \phi$) through the angle $\omega$ using the first four butterflies. Simulation results show that 16-bit accuracy can be retained on the sine and cosine outputs while employing the $\tan 2^{-k} = 2^{-k}$ approximation for all stages beyond Stage 4 with a 22-bit internal word length.

Additional savings in chip area can be obtained by employing carry-save arithmetic. According to the present invention, the m final butterflies after stage $i = (B-1)/2$ can be merged together such that $X_{i+m}$ and $Y_{i+m}$ can be obtained directly from $X_i$ and $Y_i$ as follows:

$$X_{i+m} = X_i - Y_i \sum_{k=i}^{i+m-1} r_k \tan(2^{-k})$$

$$Y_{i+m} = Y_i + X_i \sum_{k=i}^{i+m-1} r_k \tan(2^{-k})$$

Figure 10:
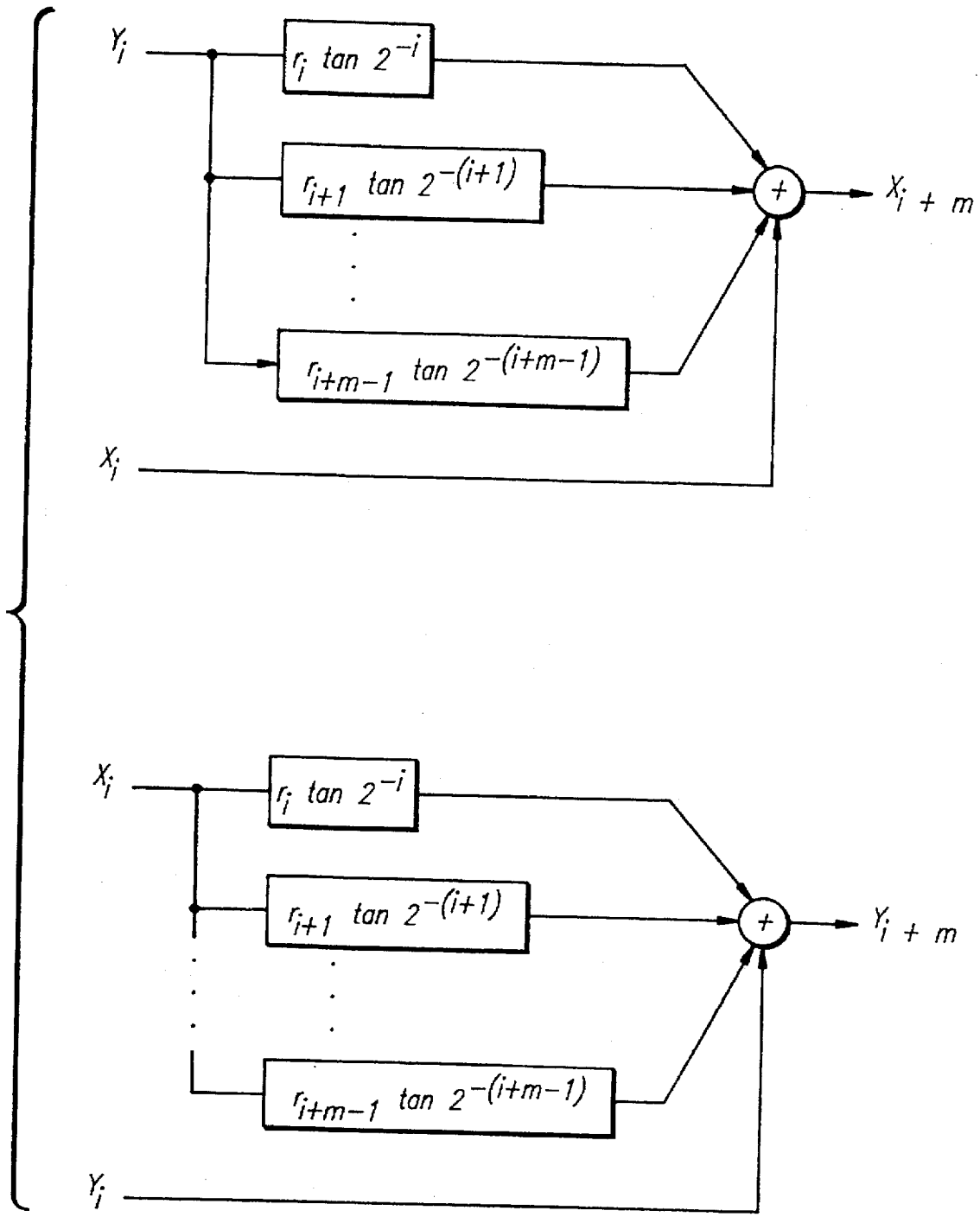
FIG. 10 shows a general block diagram of the carry-save stages.
Figure 11A:
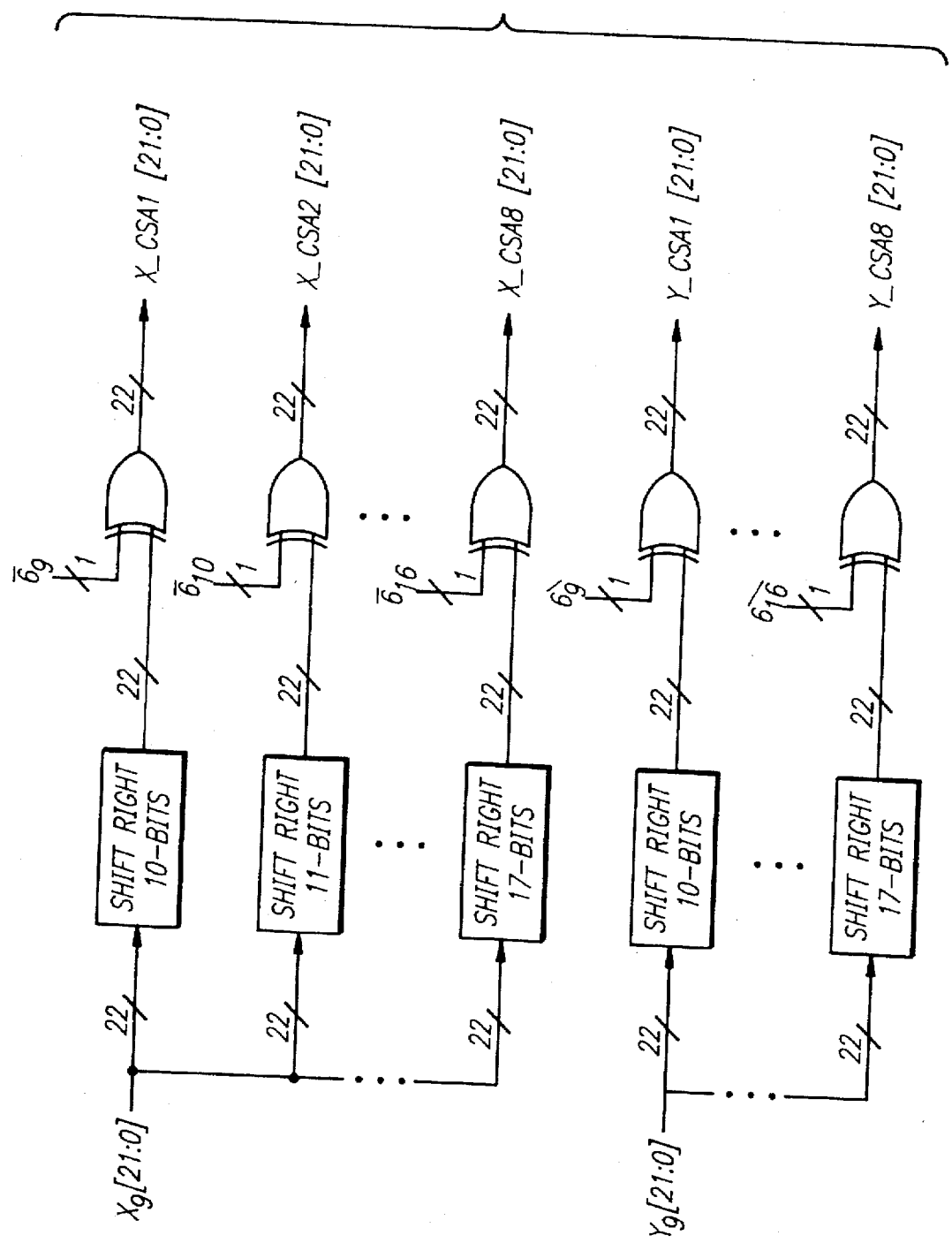
FIGS. 11a–11b show the carry-save stages of FIG. 4 in greater detail.
Figure 11B:
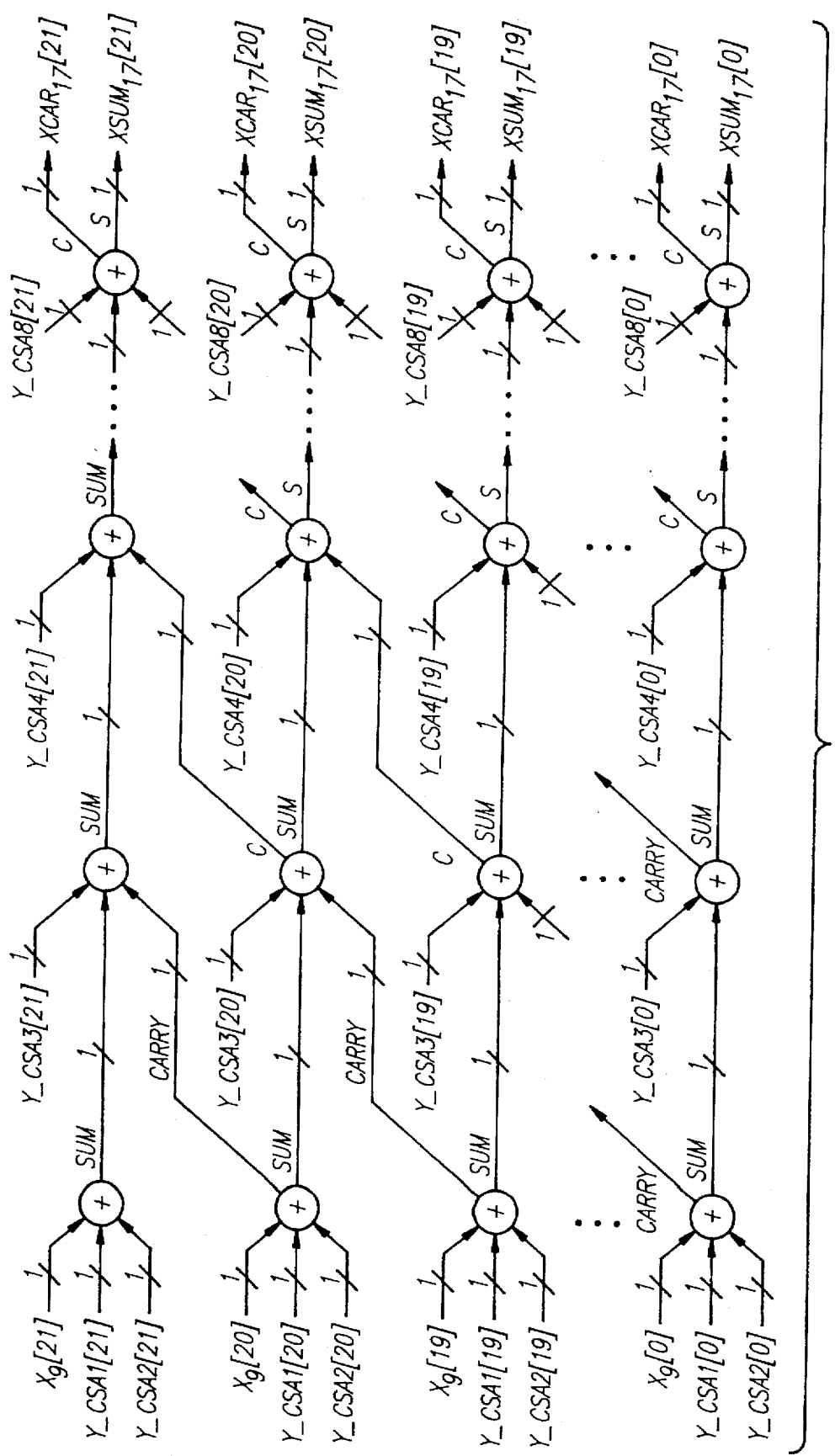

The above equations are obtained by applying the m butterfly rotations repeatedly until ($X_{i+m}, Y_{i+m}$) are expressed in terms of ($X_i, Y_i$). In doing this, all terms involving products of the form $(r_k)(r_{k+1})(\tan 2^{-k-1})(\tan 2^{-k})$ can be discarded whenever $k > B/3$ and $k \geq (B-1)/2$. The first inequality allows the $\tan \theta_k$ multipliers to be represented by a power-of-two and the second inequality ensures that the product corresponds to a shift right by a number of bits greater than the word length of the datapath. FIG. 10 shows a general block diagram of the carry-save stages and FIGS. 11a–11b illustrate the carry-save stages of the preferred embodiment of FIG. 4 in greater detail.

As shown in FIG. 4, the "$1^{st}$-quadrant $\pi/4$ mirror" 14 control block receives the third most significant bit of the normalized angle and the 19 least significant truncated phase accumulator bits, denoted by $\bar{\theta}$. The third most significant bit indicates whether the desired angle is in the upper or lower half of any quadrant. The "$1^{st}$-quadrant $\pi/4$ mirror" 14 comprises a subtracter replacing $\bar{\theta}$ by $(1-\bar{\theta})$ whenever the desired angle is in the upper half of any quadrant.

The $\pi/4$-multiplier 13 of FIG. 4 converts the normalized phase accumulator and $\pi/4$-mirror output $\bar{\theta}$ to a value $\theta$ in radians. In the preferred embodiment it comprises five hard-wired partial products.

By putting the 1st-quadrant mirror 14 before the $\pi/4$-multiplier 13 it then deals with a normalized angle $\bar{\theta}$ and hence its subtracter implements the replacement of $\bar{\theta}$ by $(1-\bar{\theta})$ whenever $\bar{\theta}$ is greater than ½. An alternate implementation would reverse the order of occurrence of the two blocks. This would require the $\pi/4$-mirror 14 to perform subtractions $(\pi/2-\theta)$. The $(1-\bar{\theta})$ subtraction requires less hardware to implement than the $(\pi/2-\theta)$ subtraction, as $(1-\bar{\theta})$ can be implemented by just performing exclusive-OR operations on the bits of $\bar{\theta}$.

Figure 8:
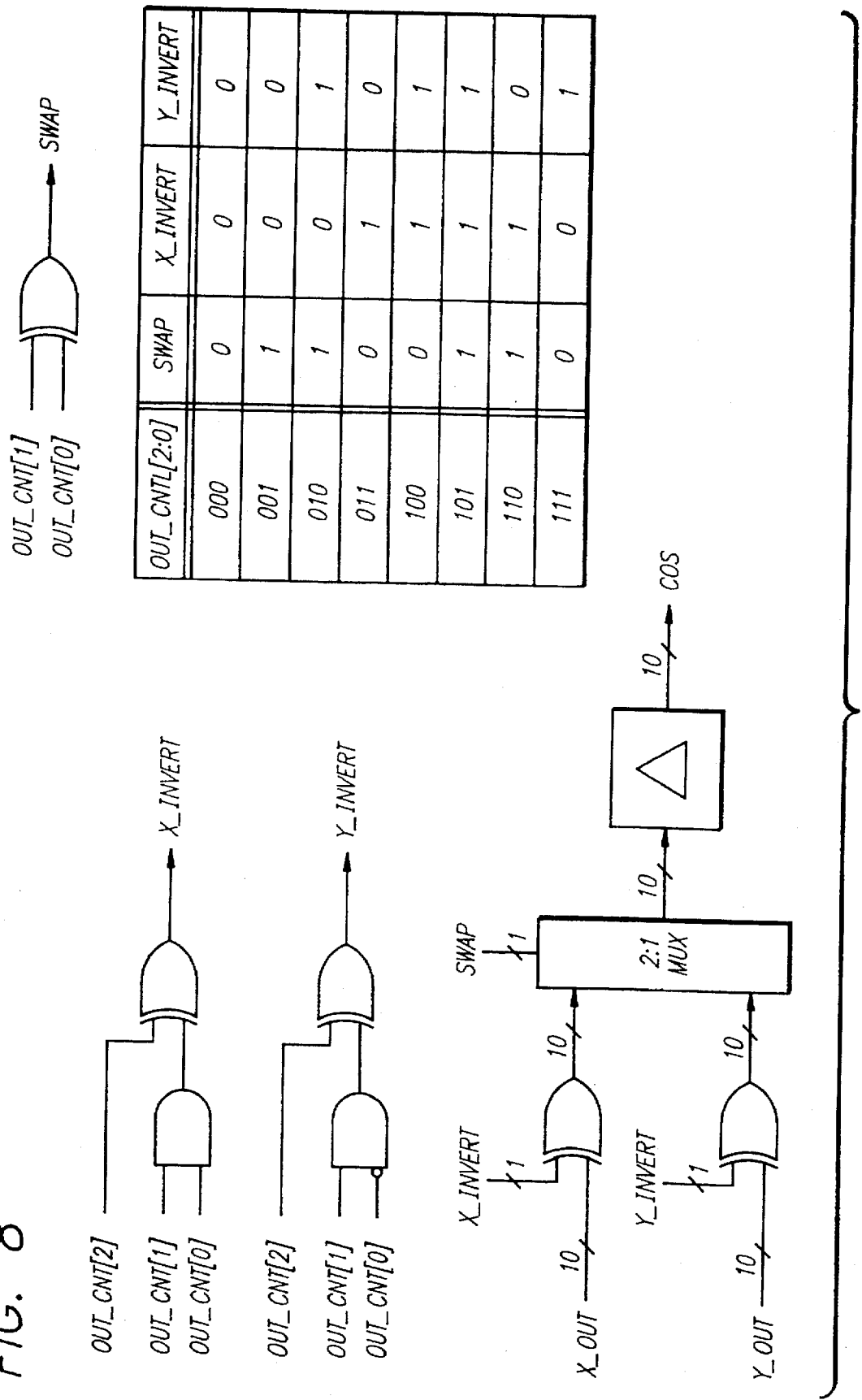
FIG. 8 illustrates output control select circuitry for the DDFS of FIG. 4.
Figure 12:
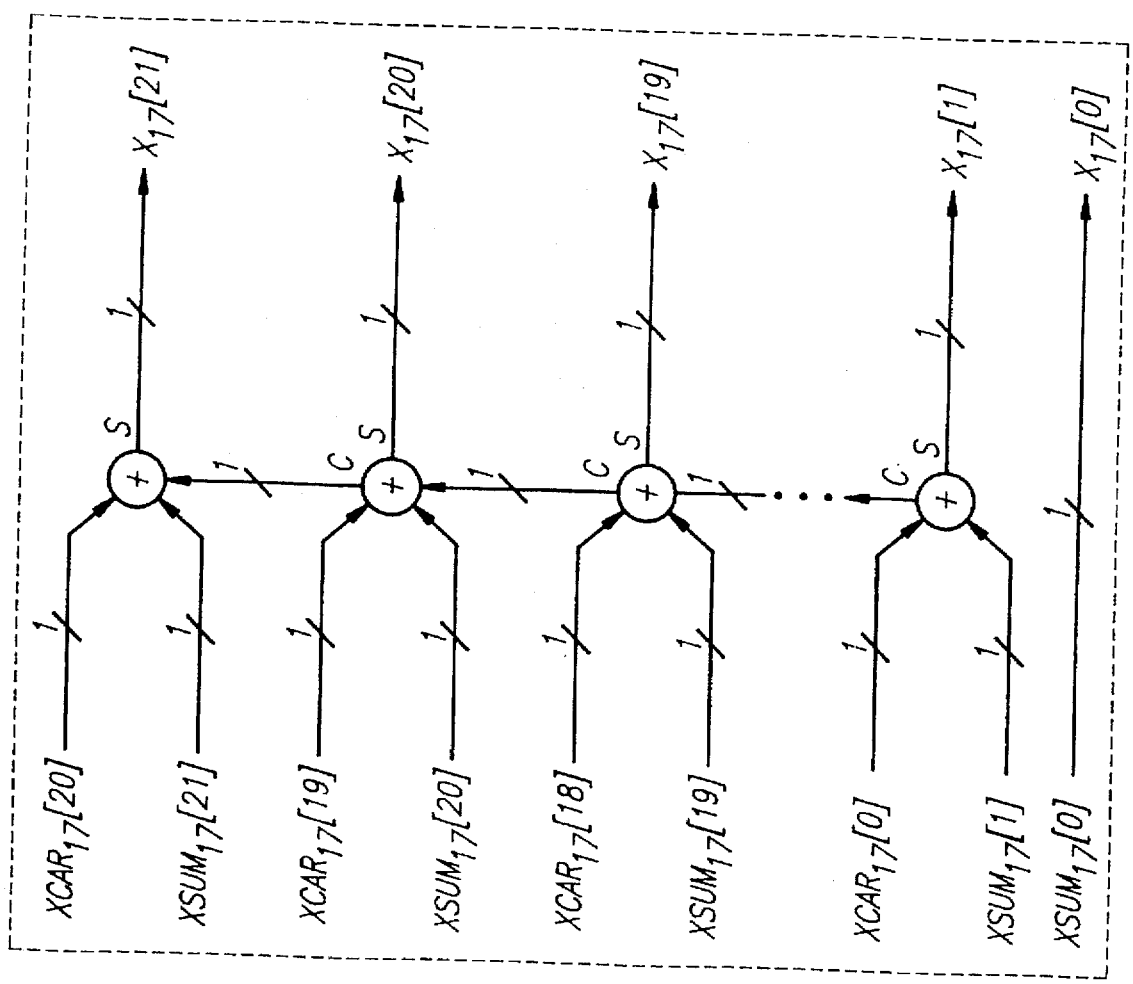
FIG. 12 is a block diagram of a vector merge adder that is used in conjunction with the carry save stages illustrated in FIG. 4.

The VMA 21 illustrated in FIG. 4 produces the final cosine/sine values from the datapath outputs. The VMA 21 combines the carry and sum outputs from the carry-save stages to produce two's complement values for the datapath's $X_n$ and $Y_n$ outputs. These output values are then used in the output-select circuit 22, as illustrated in FIG. 8, to map the computed $X_n$ and $Y_n$ values in $[0, \pi/4]$ to the appropriate cosine/sine values in $[0, 2\pi]$. FIG. 12 shows a block diagram of the VMA 21 of the preferred embodiment.

Since the computed angles lie in the interval $[0, \pi/4]$, and all angle rotations are performed in the first quadrant, the $X_k$ and $Y_k$ values computed by the butterfly stages 18 are always positive. This has the important architectural consequence that no sign-extensions are ever required when shifting the data by k bits (i.e., the $2^{-k}$ multiplier), thereby reducing the load on the MSB's at each stage and facilitating high-speed operation.

For a DDFS where only one output is needed (either cosine or sine), further reduction in the amount of required hardware can be obtained. For example, to produce only the cosine output, the circuitry used to compute the sine output can be discarded after stage $(B-1)/2$ where "butterflies" are no longer required and the computation can be performed in parallel using carry-save arithmetic. This, however, requires that values be computed for angles in $[0, \pi/2]$, as opposed to $[0, \pi/4]$, because sine output values are not available to swap with cosine values whenever the angle is in the upper half of the quadrant.

An additional hardware reduction can be achieved for a DDFS which requires no butterflies after the ROM implementation of the initial stages. That is, for cases where a ROM is used for the initial $(B-1)/2$ stages and the remaining stages can be implemented using parallel carry-save arithmetic without butterflies. One example would be a DDFS with 10-bit output precision where a 26-word ROM is used for the first 5 stages and the remaining stages are implemented using carry-save arithmetic without butterflies. For such cases, the $\pi/4$-multiplier hardware that converts the normalized angle $\bar{\theta}$ to a radian value $\theta$ can be eliminated by factoring out the radian conversion factor from the $\tan \theta_k$ rotation multipliers and including that information in the values stored in the ROM table. This is valid since the stages following the ROM use the $\tan \theta_k = \theta_k$ approximation and the $X_N$ and $Y_N$ output values can be computed directly from the ROM outputs without butterflies.

Figure 9:
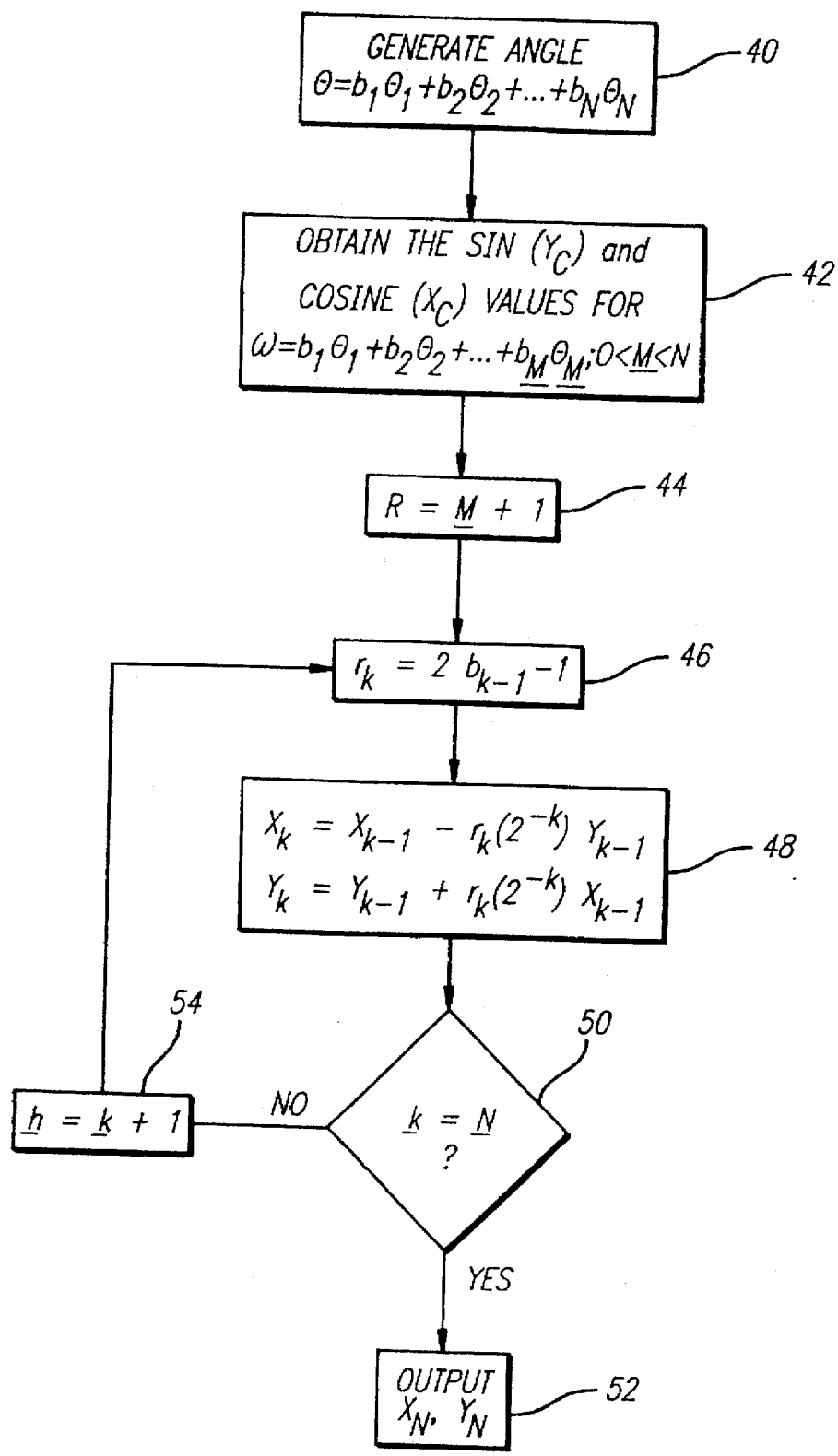
FIG. 9 is a flow chart of the present invention.

To emphasize that the present invention may be implemented with hardware embodiments other than those described with reference to FIG. 4, FIG. 9 is a flow chart of the present invention. At block 40, $\theta = b_1\theta_1 + b_2\theta_2 + \ldots + b_N\theta_N$ is generated where $b_k \in \{0, 1\}$ are the binary bits and the $\theta_k = 2^{-k}$ are the associated positional weights. At block 42, the sine and cosine values for a subangle $\omega$ of $\theta$ are obtained through a multiplexer, table-lookup, or similar device. In a preferred embodiment, $\omega$ is chosen such that subsequent subangles that are processed obey the approximation $\tan \theta_k = \theta_k$. At block 44, k is set equal to M+1 and at block 46, the binary $b_k \in \{0, 1\}$ are recoded into signed digits $r_k \in \{-1, 1\}$ for an arbitrary angle $\theta$ by the mapping $r_k = 2b_{k-1} - 1$. The sine and cosine values determined at block 42 are inputs to the formulae:

$$X_k = X_{k-1} - r_k 2^{-k} Y_{k-1}$$

$$Y_k = Y_{k-1} + r_k 2^{-k} X_{k-1}$$

where $X_{k-1}$ is the cosine value and $Y_{k-1}$ is the sine value. The determined $X_k$ cosine value and $Y_k$ sine value are then provided as inputs to the formulae in block 48, repeatedly, as k is incremented, until the desired accuracy is reached, as shown at blocks 50 and 54. At block 52, the final X and Y values, corresponding to the desired cosine and sine values, are output.

Although the present invention has been described in terms of a preferred embodiment and with reference to FIGS. 1–12, it will be appreciated that various modifications and alterations might be made by those skilled in the art without departing from the spirit and scope of the invention. The invention should therefore be measured in terms of the claims which follow.

We claim:

1. In a digital device for generating an output digital signal representing a first trigonometric function in response to an input digital signal representing a plurality of angles, a method of converting angle data of said input digital signal to amplitude data of said output digital signal comprising the following steps:

representing one of said angles as a sum of a plurality of subangles;

digitally computing a second trigonometric function value for at least one of the subangles of said one of said angles, wherein said computation is performed, for one or more of the subangles, by using the subangle itself as an approximation of the second trigonometric function value;

digitally computing a value for the first trigonometric function in response to said one of said angles based upon said second trigonometric function value;

repeating the foregoing steps for each of the plurality of said angles; and forming said output digital signal using the value of the first trigonometric function computed for each one of said angles.

2. The method of claim 1 wherein:

said one of said angles comprises the angle $\theta = b_1\theta_1 + \ldots + b_N\theta_N$ where, for $k=1, \ldots, N$, $\theta_k = 2^{-k}$ radians and $b_k$ are binary values; and said second trigonometric function comprises a tangent function.

3. The method of claim 2 wherein the step of digitally computing a second trigonometric function value comprises the step of computing, for at least one subangle, transformation function values comprising:

$$X_k = X_{k-1} - r_k 2^{-k} Y_{k-1}$$

$$Y_k = Y_{k-1} + r_k 2^{-k} X_{k-1}$$

where $r_k = 2b_{k-1} - 1$, said at least one subangle comprises the angle $2^{-k}$ radians, $X_k$ and $X_{k-1}$ comprise cosine values, and $Y_k$ and $Y_{k-1}$ comprise sine values.

4. The method of claim 3 wherein said cosine and sine values $X_{k-1}$ and $Y_{k-1}$ are selected with a multiplexer or obtained from a ROM.

5. The method of claim 4 wherein $k=6$.

6. The method of claim 3 wherein said transformation function values are computed sequentially for the subangles to obtain a desired accuracy for said first trigonometric function, with the computed values $X_k$ and $Y_k$ as the input values $X_{k-1}$ and $Y_{k-1}$ for the next sequential computation.

7. The method of claim 2 further comprising the step of multiplying said value for the first trigonometric function by $\cos(b_1\theta_1) \ldots \cos(b_N\theta_N)$ prior to forming said output digital signal.

8. The method of claim 1 wherein said step of forming said output digital signal comprises the step of forming said output digital signal based upon the approximate value of said first trigonometric function for each one of said angles.

9. The method of claim 1 further comprising the step of:

prior to computing said second trigonometric function value for any of said angles that has a value $\theta$ in the upper half of any quadrant, replacing the value $\theta$ of the angle by $(1-\theta)$;

wherein said output digital signal is formed based in part upon the value of said first trigonometric function at $(1-\theta)$ whenever said any angle is in the upper half of any quadrant.

10. The method of claim 1, wherein the step of digitally computing said second trigonometric function value comprises the steps of:

providing the angle by a phase accumulator, said phase accumulator providing a normalized value of the angle; and providing said normalized value to a multiplier to convert said angle to a radian value.

11. In a digital device for generating an output digital signal representing a trigonometric function in response to an input digital signal representing a plurality of angles, a method of converting angle data of said input digital signal to amplitude data of said output digital signal comprising the following steps:

representing one of said angles as a sum of a plurality of subangles and in binary by a plurality of bits, each said bit corresponding to a subangle;

digitally computing values of a first transformation function, wherein the result of said computation, for one or more of the subangles of said one of said angles, depends upon a function of at least one of said bits or depends on the value of at least one of said subangles;

digitally computing a value for the trigonometric function in response to said one of said angles based upon said first transformation function values;

repeating the foregoing steps for each of the plurality of said angles; and forming said output digital signal using the value of the trigonometric function computed for each one of said angles.

12. The method of claim 11 wherein:

said one of said angles comprises the angle $\theta = b_1\theta_1 + \ldots + b_N\theta_N$ where, for $k=1, \ldots, N$, $\theta_k = 2^{-k}$ radians and $b_k$ are binary values; and said method further comprises the step of computing values of a second transformation function prior to computing said value of the trigonometric function.

13. The method of claim 12 wherein said first and second transformation functions comprise:

$$X_k = X_{k-1} - r_k 2^{-k} Y_{k-1}$$

$$Y_k = Y_{k-1} + r_k 2^{-k} X_{k-1},$$

where $r_k = 2b_{k-1} - 1$ comprises said function of at least one of said bits, said at least one subangle comprises the angle $2^{-k}$ radians, $X_k$ and $X_{k-1}$ comprise cosine values, and $Y_k$ and $Y_{k-1}$ comprise sine values.

14. The method of claim 13 wherein said cosine and sine values $X_{k-1}$ and $Y_{k-1}$ are selected with a multiplexer or obtained from a ROM.

15. The method of claim 14 wherein $k=6$.

16. The method of claim 13 wherein values of said first and second transformation functions are computed sequentially for the subangles to obtain a desired accuracy for said trigonometric function, with the computed values $X_k$ and $Y_k$ as the input values $X_{k-1}$ and $Y_{k-1}$ for the next sequential computation.

17. The method of claim 12 further comprising the step of multiplying said value for the trigonometric function by $\cos(b_1\theta_1) \ldots \cos(b_N\theta_N)$ prior to forming said output digital signal.

18. The method of claim 11 wherein said function of at least one of said bits comprises the identity function.

19. The method of claim 11 wherein said step of forming said output digital signal comprises the step of forming said output digital signal based upon the approximate value of the trigonometric function for each one of said angles.

20. The method of claim 11 further comprising the step of:

prior to computing said trigonometric function value for any of said angles that has a value θ in the upper half of any quadrant, replacing the value θ of said any angle by (1−θ):

wherein said output digital signal is formed based in part upon the value of said trigonometric function at ( ) (1−θ) whenever said any angle is in the upper half of any quadrant.

21. The method of claim 11, wherein the step of digitally computing the trigonometric function comprises the steps of:

providing the angle by a phase accumulator, said phase accumulator providing a normalized value of the angle; and providing said normalized value to a multiplier to convert said angle to a radian value.

22. In a digital device for generating an output digital signal representing a first trigonometric function in response to an input digital signal representing a plurality of angles, a method of converting angle data of said input digital signal to amplitude data of said output digital signal comprising the following steps:

representing one of said angles as a sum of a plurality of subangles;

prestoring a second trigonometric function value for at least one of said subangles of said one of said angles;

digitally computing a third trigonometric function value for a different one of said subangles of said one of said angles;

digitally computing a value for the first trigonometric function in response to said one of said angles based upon said second and third trigonometric function values;

repeating the foregoing steps for each of the plurality of said angles; and forming said output digital signal using the value of the first trigonometric function computed for each one of said angles.

23. The method of claim 22 wherein said second trigonometric function is prestored as a selection input to a multiplexer.

24. The method of claim 22 wherein said second trigonometric function is prestored in a ROM table.

25. A digital circuit for generating an output digital signal representing a first trigonometric function in response to an input digital signal representing a plurality of angles, each one of said angles being equal to a sum of a plurality of subangles, said circuit comprising:

a first circuit element structured and configured to digitally compute a second trigonometric function value for at least one of the subangles of one of said angles using said digital circuit, wherein said computation is performed, for one or more of the subangles, by using the subangle itself as an approximation of the second trigonometric function value;

a second circuit element coupled to the first circuit element and structured and configured to digitally compute a value for the first trigonometric function in response to said one of said angles based upon said second trigonometric function value;

wherein the first and second circuit elements are further structured and configured to repeat the foregoing computations for each of the plurality of said angles; and a third circuit dement coupled to the second circuit element and structured and configured to form said output digital signal using the value of the first trigonometric function computed for each one of said angles.

26. The circuit of claim 25 wherein:

said one of said angles comprises the angle $\theta=b_1\theta_1+\ldots+b_N\theta_N$ where, for $k=1,\ldots,N$, $\theta_k=2^{-k}$ radians and $b_k$ are binary values; and said second trigonometric function comprises a tangent function.

27. The circuit of claim 26 wherein said third circuit element is further structured and configured to multiply the value for the first trigonometric function by $\cos(b_1\theta_1)\ldots\cos(b_N\theta_N)$ to form said output digital signal.

28. The circuit of claim 26 wherein said first circuit element is structured and configured to digitally compute said second trigonometric function value by computing, for said at least one subangle, transformation function values comprising:

$$X_k=X_{k-1}-r_k 2^{-k}Y_{k-1}$$
$$Y_k=Y_{k-1}+r_k 2^{-k}X_{k-1}$$

where $r_k=2b_{k-1}-1$, said at least one subangle comprises the angle $2^{-k}$ radians, $X_k$ and $X_{k-1}$ comprise cosine values, and $Y_k$ and $Y_{k-1}$ comprise sine values.

29. The circuit of claim 28 wherein said first circuit element comprises a multiplexer or ROM for selecting said cosine and sine values $X_{k-1}$ and $Y_{k-1}$.

30. The circuit of claim 27 wherein k=6.

31. The circuit of claim 28 wherein said first circuit element is further structured and configured to compute said transformation function values sequentially for the subangles to obtain a desired accuracy for said first trigonometric function, with the computed values $X_k$ and $Y_k$ as the input values $X_{k-1}$ and $Y_{k-1}$ for the next sequential computation.

32. The circuit of claim 28 wherein said first circuit element further comprises a plurality of adders and a plurality of shifters configured in a butterfly stage for computing said transformation function values.

33. The circuit of claim 28 wherein said first circuit element further comprises a carry save circuit for computing said transformation function values.

34. The circuit of claim 25 wherein said third circuit element is structured and configured to form said output digital signal based upon the approximate value of said first trigonometric function for each one of said angles.

35. The circuit of claim 25 further comprising:

a fourth circuit element coupled to the first circuit element and structured and configured, such that for any angle that has a value θ in the upper half of any quadrant, to replace the value θ of said any angle by (1−θ).

36. The circuit of claim 25 further comprising:

a phase accumulator structured and configured to provide a normalized value of the angle; and a multiplier coupled to said phase accumulator and said first circuit element, said multiplier configured to convert said angle to a radian value for input to the first circuit element.

37. The circuit of claim 25 wherein said third circuit element comprises a vector merge adder and output select circuit.

38. A digital circuit for generating an output digital signal representing a trigonometric function in response to an input digital signal representing a plurality of angles, each one of said angles being equal to a sum of a plurality of subangles and represented in binary by a plurality of bits, each said bit corresponding to a subangle, said circuit comprising:

a first circuit element structured and configured to digitally compute, for one of said angles, values of a first transformation function, wherein the result of said computation, for one or more of the subangles, depends upon a function of at least one of said bits or depends on the value of at least one of said subangles;

a second circuit element coupled to the first circuit element and structured and configured to digitally compute a value for the trigonometric function in response to said one of said angles based upon said first transformation function values;

wherein the first and second circuit elements are further structured and configured to repeat the foregoing computations for each of the plurality of said angles; and a third circuit dement coupled to the second circuit element and structured and configured to form said output digital signal using the value of the trigonometric function computed for each of the plurality of said angles.

39. The circuit of claim 38 wherein:

said one of said angles comprises the angle $\theta = b_1\theta_1 + \ldots + b_N\theta_N$ where, for $k=1, \ldots, N$, $\theta_k = 2^{-k}$ radians and $b_k$ are binary values; and wherein said first circuit element is further structured and configured to digitally compute values of a second transformation function.

40. The circuit of claim 39 wherein said third circuit element is further structured and configured to multiply the value for the trigonometric function by $\cos(b_1\theta_1) \ldots \cos(b_N\theta_N)$ to form said output digital signal.

41. The circuit of claim 39 wherein said first and second transformation functions comprise:

$$X_k = X_{k-1} - r_k 2^{-k} Y_{k-1}$$

$$Y_k = Y_{k-1} + r_k 2^{-k} X_{k-1},$$

where $r_k = 2b_{k-1} - 1$ comprises said function of at least one of said bits, said at least one subangle comprises the angle $2^{-k}$ radians, $X_k$ and $X_{k-1}$ comprise cosine values, and $Y_k$ and $Y_{k-1}$ comprise sine values.

42. The circuit of claim 41 wherein said first circuit element comprises a multiplexer or ROM for selecting said cosine and sine values $X_{k-1}$ and $Y_{k-1}$.

43. The circuit of claim 42 wherein $k=6$.

44. The circuit of claim 41 wherein said first circuit element is structured and configured to compute values of said first and second transformation functions sequentially for the subangles to obtain a desired accuracy for said trigonometric function, with the computed values $X_k$ and $Y_k$ as the input values $X_{k-1}$ and $Y_{k-1}$ for the next sequential computation.

45. The circuit of claim 41 wherein said first circuit element further comprises a plurality of adders and a plurality of shifters configured in a butterfly stage for computing said values of said first and second transformation functions.

46. The circuit of claim 41 wherein said first circuit element further comprises a carry save circuit for computing said values of said transformation function.

47. The circuit of claim 38 wherein said function of at least one of said bits comprises the identity function.

48. The circuit of claim 38 wherein said third circuit element is structured and configured to form said digital signal based upon the approximate value of said trigonometric function at each one of said angles.

49. The circuit of claim 38 further comprising a ROM table for storing partial sine and cosine values of a plurality of said angles.

50. The circuit of claim 38 further comprising:

a fourth circuit element coupled to the first circuit element and structured and configured, such that for any angle $\theta$ that is in the upper half of any quadrant, to replace the value of said any angle by $(1-\theta)$.

51. The circuit of claim 38 further comprising:

a phase accumulator structured and configured to provide a normalized value of said one of said plurality of angles; and a multiplier coupled to said phase accumulator and said first circuit element and structured and configured to convert said angle to a radian value for input to the first circuit element.

52. The circuit of claim 38 wherein the fourth circuit element comprises a vector merge adder and output select circuit.

53. A digital circuit for generating an output digital signal representing a first trigonometric function in response to an input digital signal representing a plurality of angles, each one of said angles being equal to a sum of a plurality of subangles, said circuit comprising:

a first circuit element structured and configured to pre-store a second trigonometric function value for at least one of said subangles of one of said angles;

a second circuit element coupled to the first circuit element and structured and configured to digitally compute a third trigonometric function value for a different one of said subangles of said one of said angles;

a third circuit element coupled to the first and second circuit elements and structured and configured to digitally compute a value for the first trigonometric function in response to said one of said angles based upon said second and third trigonometric function values;

wherein the second and third circuit elements are structured and configured to repeat the foregoing computations for each of the plurality of said angles; and a fourth circuit means coupled to said third circuit element and structured and configured to form said output digital signal using the value of the first trigonometric function computed for each of the plurality of said angles.

54. The circuit of claim 53 wherein said first circuit element comprises a multiplexer.

55. The circuit of claim 53 wherein said first circuit element comprises a ROM table.

* * * * *